US008095923B2

(12) United States Patent
Harvey et al.

(10) Patent No.: US 8,095,923 B2
(45) Date of Patent: Jan. 10, 2012

(54) SYSTEM AND METHOD FOR DEPLOYING AND MANAGING INTELLIGENT NODES IN A DISTRIBUTED NETWORK

(75) Inventors: Clint M. Harvey, Morgantown, WV (US); John E. Moody, Morgantown, WV (US); Jackie P. Williams, II, Fairmont, WV (US); Patrick R. Esposito, II, Morgantown, WV (US); George K. Thomas, Friendsville, MD (US); Jared K. Reed, Morgantown, WV (US); Brian J. Kesecker, II, Farimont, WV (US); Patrick R. Esposito, Morgantown, WV (US)

(73) Assignee: Augusta Systems, Inc., Morgantown, WV (US)

( * ) Notice: Subject to any disclaimer, the term of this patent is extended or adjusted under 35 U.S.C. 154(b) by 863 days.

(21) Appl. No.: 11/859,264

(22) Filed: Sep. 21, 2007

(65) Prior Publication Data

US 2008/0010631 A1    Jan. 10, 2008

Related U.S. Application Data

(63) Continuation-in-part of application No. 11/683,761, filed on Mar. 8, 2007, now Pat. No. 7,735,060, and a continuation-in-part of application No. 11/674,893, filed on Feb. 14, 2007.

(51) Int. Cl.
*G06F 9/44* (2006.01)
*G06F 9/445* (2006.01)

(52) U.S. Cl. ......... 717/171; 717/103; 717/176; 717/177

(58) Field of Classification Search ........................ None
See application file for complete search history.

(56) References Cited

U.S. PATENT DOCUMENTS

| | | | |
|---|---|---|---|
| 4,864,497 A | 9/1989 | Lowry | |
| 5,414,939 A | 5/1995 | Waugaman | |
| 6,633,878 B1 | 10/2003 | Underwood | |
| 6,636,242 B2 | 10/2003 | Bowman-Amuah | |
| 6,738,975 B1 | 5/2004 | Yee et al. | |
| 6,836,890 B1 | 12/2004 | Watts, Jr. et al. | |

(Continued)

OTHER PUBLICATIONS

Liu et al., AQR-toolkit: an adaptive query routing middleware for distributed data intensive systems, Jun. 2000, pp. 597-, <http://delivery.acm.org/10.1145/340000/336579/p597-liu.pdf>.*

(Continued)

*Primary Examiner* — Thuy Dao
(74) *Attorney, Agent, or Firm* — Murphy, Bilak & Homiller, PLLC

(57) ABSTRACT

According to methods, apparatuses, and computer program products described by way of non-limiting examples presented herein, a computer system operates as an intelligent node in a distributed network. In one or more embodiments, the installation and execution of a node operating computer program product ("node software") on a computer system configures that computer system to operate as an intelligent node in a distributed network. The computer system may reside at the edge of the network and thus may include a number of physical world sensors and/or actuators that represent valuable but hard-to-reach data sources/sinks from the perspective of the network at large. The node software operates the computer system as an edge application server and enterprise service bus, intelligently processing data from sensors, actuators, and other edge systems and devices. Other applications, such as server-based data processing and storing, are also easily implemented via the node software.

22 Claims, 6 Drawing Sheets

U.S. PATENT DOCUMENTS

| | | | |
|---|---|---|---|
| 6,948,150 B1 | 9/2005 | Pepin | |
| 6,950,823 B2 | 9/2005 | Amiri et al. | |
| 6,975,914 B2 | 12/2005 | DeRemer | |
| 6,980,962 B1 | 12/2005 | Arganbright | |
| 7,012,706 B1 | 3/2006 | Hansen | |
| 7,191,438 B2* | 3/2007 | Bryant | 717/176 |
| 7,284,769 B2 | 10/2007 | Breed | |
| 7,479,875 B2 | 1/2009 | Fehling et al. | |
| 7,774,242 B2 | 8/2010 | Kubach et al. | |
| 7,779,404 B2* | 8/2010 | Movassaghi et al. | 717/171 |
| 7,810,090 B2* | 10/2010 | Gebhart | 717/176 |
| 2002/0053070 A1 | 5/2002 | Seki | |
| 2003/0005179 A1 | 1/2003 | Schmit | |
| 2003/0005180 A1 | 1/2003 | Schmit | |
| 2003/0009250 A1 | 1/2003 | Resnick | |
| 2003/0028579 A1 | 2/2003 | Kulkarni | |
| 2003/0084091 A1 | 5/2003 | Agarwalla et al. | |
| 2004/0001498 A1 | 1/2004 | Chen et al. | |
| 2004/0003266 A1* | 1/2004 | Moshir et al. | 713/191 |
| 2004/0036719 A1 | 2/2004 | Van Treeck | |
| 2004/0045009 A1 | 3/2004 | Bryant | |
| 2004/0078137 A1 | 4/2004 | Breakfield | |
| 2004/0103073 A1 | 5/2004 | Blake | |
| 2004/0107417 A1* | 6/2004 | Chia et al. | 717/171 |
| 2004/0117393 A1 | 6/2004 | DeMesa | |
| 2004/0117798 A1 | 6/2004 | Newman et al. | |
| 2004/0128370 A1 | 7/2004 | Kortright | |
| 2004/0158819 A1 | 8/2004 | Cuomo et al. | |
| 2004/0187140 A1 | 9/2004 | Aigner et al. | |
| 2004/0268301 A1 | 12/2004 | Kaston | |
| 2004/0268312 A1 | 12/2004 | Abe | |
| 2005/0005262 A1 | 1/2005 | Mohan | |
| 2005/0015775 A1 | 1/2005 | Russell et al. | |
| 2005/0021713 A1* | 1/2005 | Dugan et al. | 709/223 |
| 2005/0049988 A1 | 3/2005 | Dahlquist et al. | |
| 2005/0055449 A1 | 3/2005 | Rappold | |
| 2005/0071850 A1 | 3/2005 | Ittel | |
| 2005/0080814 A1 | 4/2005 | Hailey | |
| 2005/0102652 A1 | 5/2005 | Sulm | |
| 2005/0132294 A1 | 6/2005 | Dinger | |
| 2005/0149558 A1 | 7/2005 | Zhuk | |
| 2005/0160400 A1 | 7/2005 | Pepin | |
| 2005/0171746 A1* | 8/2005 | Thalhammer-Reyero | 703/2 |
| 2005/0177269 A1 | 8/2005 | Funk | |
| 2005/0177818 A1 | 8/2005 | Huene | |
| 2005/0246716 A1 | 11/2005 | Smith | |
| 2005/0285740 A1 | 12/2005 | Kubach et al. | |
| 2005/0289124 A1 | 12/2005 | Kaiser | |
| 2006/0002387 A1 | 1/2006 | Lawrence | |
| 2006/0009944 A1 | 1/2006 | Shah | |
| 2006/0013458 A1 | 1/2006 | Debbins | |
| 2006/0020912 A1* | 1/2006 | Illowsky et al. | 717/103 |
| 2006/0026588 A1* | 2/2006 | Illowsky et al. | 717/171 |
| 2006/0036745 A1 | 2/2006 | Stienhans | |
| 2006/0047545 A1 | 3/2006 | Kumar | |
| 2006/0058987 A1 | 3/2006 | Kumar | |
| 2006/0059127 A1 | 3/2006 | Berry | |
| 2006/0064422 A1 | 3/2006 | Arthurs | |
| 2006/0064677 A1 | 3/2006 | Bickson | |
| 2006/0067209 A1 | 3/2006 | Sheehan et al. | |
| 2006/0074736 A1 | 4/2006 | Shukla | |
| 2006/0075112 A1 | 4/2006 | Polozoff | |
| 2006/0075408 A1* | 4/2006 | Powers et al. | 718/100 |
| 2006/0092142 A1 | 5/2006 | Gillespie | |
| 2006/0095195 A1 | 5/2006 | Nishimura et al. | |
| 2006/0106585 A1 | 5/2006 | Brown | |
| 2006/0111880 A1 | 5/2006 | Brown | |
| 2006/0117251 A1 | 6/2006 | Rothschiller | |
| 2006/0123010 A1 | 6/2006 | Landry et al. | |
| 2006/0142978 A1 | 6/2006 | Suenbuel et al. | |
| 2006/0161909 A1 | 7/2006 | Pandey et al. | |
| 2006/0165040 A1 | 7/2006 | Rathod et al. | |
| 2006/0206850 A1 | 9/2006 | McCubbrey | |
| 2007/0300217 A1* | 12/2007 | Tunmer et al. | 717/177 |

OTHER PUBLICATIONS

C. P. Bianchini, Intelligent management of network devices aided by a strategy and a tool, Oct. 2003, pp. 141-151, <http://delivery.acm.org/10.1145/1040000/1035675/p141-bianchini.pdf>.*

Tynan et al., Intelligent agents for wireless sensor networks, pp. 1179-1180, Jul. 2005, <http://delivery.acm.org/10.1145/1090000/1082682/p1179-tynan.pdf>.*

Gu, X. et al. "Adaptive Offloading for Pervasive Computing." IEEE Pervasive Computing, vol. 3, Issue 3, Jul.-Sep. 2004, pp. 66-73.

".Net Framework Remoting Overview." Microsoft Corporation 2007. Available at: http://msdn2.microsoft.com/en-us/library/kwdt6w2k.aspx.

Yocam, E. W. "Evolution on the Network Edge: Intelligent Devices." IT Professional, Vol. 5, Issue 2, Mar./Apr. 2003, pp. 32-36.

Lekas, S. "Software Add-Ons; A Low-Cost, Powerful Solution for PC-Based Data Acquisition." Adapted from an article that appeared in ECN, Apr. 1996. Available at: http://www.iotech.com/ecnapr96.html.

Gu, X. et al. "An XML-based Quality of Service Enabling Language for the Web." Journal of Visual Languages & Computing, vol. 13, No. 1, Feb. 2002, pp. 61-95.

"PC-BOT 914 Components for Visual Studio 2005." White Box Robotics, May 12, 2007. Available at: http://whiteboxrobotics.com/PCBOTs/pdf/PC-BOT_dotNet_v1.0_documentation.pdf.

"0.0 Setting up the Visual Studio Environment with Phidgets.NET." Pervasive Computing, Lab Notes, Sep. 7, 2005. Available at: http://www.informatics.indiana.edu/yrogers/pervasive/downloads/InterfaceSkinTest.pdf.

Wong, W. "SDK Targets Emerging Robotics Market." Electronic Design (ED Online ID #13272), Sep. 1, 2006. Available at: http://electronicdesign.com/Articles/Index.cfm?AD=1&ArticleID=13272.

6NET.ORG. "Deliverable 2.2.3." Editor Tim Chown, University of Southampton, May 2004.

Golatowski et al., "Service-Oriented Software Architecture for Sensor Networks," International Workshop on Mobile Computing, Jun. 1, 2003, pp. 1-8, Rostock, Germany.

Levis et al., "TinyOS: An Operating System for Sensor Networks," Ambient Intelligence, Jan. 1, 2005, pp. 115-148, Springer Berlin Heidelberg, Germany.

Marin et al., "Sensor Bean: A Component Platform for Sensor-Based Services," Proceedings for the 3rd International Workshop on Middleware for Pervasive and Ad-Hoc Computing, Nov. 28, 2005, pp. 1-8, vol. 115, Grenoble, France.

Morton et al., "An Approach to Develop Component-Based Control Software for Flexible Manufacturing Systems," Proceedings of the American Control Conference, pp. 4708-4713, May 8-10, 2002, IEEE, New York, NY.

Office Action mailed Oct. 27, 2010 in co-pending U.S. Appl. No. 11/478,085.

* cited by examiner

SYSTEM AND METHOD FOR DEPLOYING AND MANAGING INTELLIGENT NODES IN A DISTRIBUTED NETWORK

RELATED APPLICATIONS

This application claims priority under 35 U.S.C. §120 as a continuation-in-part of the co-pending and commonly assigned pending U.S. patent application entitled, METHOD AND SYSTEM FOR RAPIDLY DEVELOPING AND DEPLOYING SENSOR-ENABLED SOFTWARE APPLICATIONS," which was filed on 8 Mar. 2007 and assigned application Ser. No. 11/683,761, and which is incorporated herein by reference, and as a continuation-in-part of the United States patent application entitled "METHOD AND SYSTEM FOR RAPIDLY DEVELOPING SENSOR-ENABLED SOFTWARE APPLICATIONS," which was filed on 14 Feb. 2007 and assigned application Ser. No. 11/674,893, and which is incorporated herein by reference and which itself claims priority as a continuation-in-part of the United States patent application entitled "RECONFIGURABLE, HIERARCHICAL COMPONENT-BASED ARCHITECTURE & FRAMEWORK AND METHODS FOR RAPIDLY DEVELOPING SENSOR DEVICE-ENABLING SOFTWARE APPLICATIONS," which was filed on Jun. 29, 2006 and assigned application Ser. No. 11/478,085, and which is incorporated herein by reference.

BACKGROUND

1. Technical Field

The present invention generally relates to distributed networks, and particularly relates to a system and method for deploying and managing intelligent nodes in a distributed network, such as may be used to extend enterprise and IP network infrastructure to processing data from sensors, actuators, and other "edge" systems and devices.

2. Background

Enterprise networks traditionally work well at linking together different workgroups within organizations and making business applications and data available across those workgroups. However, significant challenges arise when extending enterprise network connectivity via devices and systems that operate at the network edges and provide physical world data collection and control processing. For example, integrating diverse data from edge devices and systems into enterprise networks often requires developing customized software code and "middleware" components, to provide for data input/output, formatting, conversion, translation, and communications.

The time and expertise needed to develop such software/middleware is prohibitive. Some companies skip the expense altogether and suffer from the attendant inefficiencies arising from having critical assets—sensors, actuators, and other edge systems and devices—stranded outside of their enterprise networks. Other companies bear the expense and yet get less business value from the effort than they expected, because of limitations, complexity and errors in the custom-developed integration software. By its very nature, software of that type usually is difficult and expensive to debug and maintain. Worse still, the complex, custom nature of such software clouds upgrade paths, meaning that such software may not be readily extended to new devices and systems.

As a further issue, the convergence of sensors, actuators, and other edge systems and devices into enterprise networks can overwhelm the bandwidth of networks, especially wireless networks. In addition, the sheer volume of data inflowing from edge systems and devices can overwhelm the end-users of that data. Consequently, potentially sophisticated data filtering and event detection algorithms may be needed, further raising the customization requirements and development complexity of the integration software. In many instances, one might fairly argue that acquiring data represents the easy part of building distributed, intelligent networks, and that the greater challenge lies in efficiently processing and sharing that data.

SUMMARY

According to methods, apparatuses, and computer program products described by way of non-limiting examples presented herein, a computer system operates as an intelligent node in a distributed network. "Intelligent" in this context denotes some level of cooperation or interaction by the node in a manner that contributes to the overall processing operations of the distributed network. Sensor data collection, processing, and distribution, sensor monitoring, and actuator control, all represent non-limiting examples of a node's intelligence (also referred to as the node's "distributed network behavior.")

In one or more embodiments, the installation and execution of a node operating computer program product ("node software") on a computer system configures that computer system to operate as an intelligent node in a distributed network. The computer system may reside at the edge of the network and thus may include a number of physical world sensors and/or actuators that represent valuable but hard-to-reach data sources/sinks from the perspective of the network at large. The node software operates the computer system as an edge application server and enterprise service bus, intelligently processing data from sensors, actuators, and other edge systems and devices; doing so enables enterprises to embed intelligence throughout an enterprise network, for example, on gateways, servers, and other computing systems.

In one or more such embodiments, the above node software provides sensor, actuator, system, and device connectivity, and real-time or near real-time, edge of network event processing, including data filtering, correlation, anomaly detection, notification, and encryption features. The node software in one or more embodiments further may provide protocol conversion services (e.g., IPv4-IPv6 translation, packet-non-packet data/messaging exchange, etc.) and data translation. For example, the node software may be configured to collect raw sensor data, filter, test, or otherwise condition it, and distribute such data in standardized file formats (e.g., EXCEL, XML, binary, etc.), and/or to populate common database tables with that data. Such operations effectively extend an enterprise's IP network and IT infrastructure to the physical world of sensors and actuators.

Accordingly, a computer program product for installation and execution on a computer system, to thereby operate the computer system as an intelligent node in a distributed network, comprises a run-time environment, an application control module, and a communication engine. The run-time environment dynamically instantiates and executes software agents native to the run-time environment, in accordance with user-configured software agent definitions, while the application control module controls specified third-party applications installed on the computer system, and enables the software agents executing within the run-time environment to interact with the specified third-party applications. The communication engine pulls or otherwise receives user-configured software agent definitions into the intelligent node from elsewhere in the distributed network, for dynamic instantiation and execution within the run-time environment.

The software agents executing within the run-time environment define the distributed network behavior of the intelligent node and define the rules for advertising and sharing that distributed network behavior within the distributed network. Accordingly, the distributed network behavior of the intelligent node can be changed on the fly by adding, replacing, or modifying the software agents residing on it. Moreover, in at least one embodiment, the communication engine allows a remote computer system to control which software agents currently residing on the intelligent node are loaded and unloaded from the run-time environment; node behavior thus can be controlled by loading/unloading (enabling/disabling) targeted ones of the software agents residing on the intelligent node.

The node software may further include, or be associated with and make use of, a predefined library of software components configured as hierarchical building blocks for implementing data acquisition, data processing, and control applications. In one such embodiment, the software agent definitions each comprises an information set specifying the types and numbers of software components to be instantiated from the library, and further comprises corresponding component configuration parameter settings and hierarchical component linking information. Correspondingly, the run-time environment is configured to dynamically instantiate a given software agent by instantiating, configuring, and linking software components from the predefined library of software components in accordance with the corresponding information set.

As one example, the library includes a sensor system component that operates as a self-contained data processing software agent linkable to specified data sources and data sinks, and operative to trigger specified processing and control actions responsive to detecting defined data events. As another example, the library includes an actions component linkable as a child component of a sensor system component and configured to imbue the sensor system component with autonomous processing behavior. Each actions component is operative to carry out one or more actions with respect to a first software component in response to monitoring the first or a second software component for event occurrences, and each actions component is also configurable via information in the software agent definition used to instantiate it.

In another embodiment, a computer system configured to operate as an intelligent node in a distributed network comprises a run-time environment, a communication interface, and an application control module. The run-time environment instantiates and executes software agents native to the run-time environment, according to user-configured software agent definitions. As before, the software agents executing natively within the run-time environment define the distributed network behavior of the intelligent node and define the rules for advertising and sharing that behavior with other intelligent nodes in the distributed network. In complementary fashion, the communication interface supports sending and receiving data, including user-configured software agent definitions for use by the run-time environment in instantiating corresponding software agents, and the application control module controls specified third-party applications installed on the computer system and enables the software agents executing within the run-time environment to interact with the specified third-party applications.

In another embodiment, a system for building distributed networks of intelligent nodes comprises a node operating computer program product for installation and execution on a computer system intended for operation as an intelligent node in a distributed network, a node interfacing computer program product for installation and execution on a computer system intended for use as an interface to intelligent nodes, and, optionally, a software component toolset. The node computer program product (node software) comprises a run-time environment for building and executing software agents according to received software agent definitions, and a communication engine configured with a default messaging protocol enabling a remote node to transfer desired software agent definitions into the run-time environment.

In turn, the node interfacing computer program product (interface software) comprises user and communication interfaces for building the desired software agent definitions according to user-specified parameters, and transferring the desired software agent definitions to one or more targeted intelligent nodes. Complementing this arrangement, the software component toolset, which is installable at intelligent nodes for building software agents according to the desired software agent definitions, comprises a hierarchical set of software components. Those components are configured as building blocks for data acquisition, data processing, and control applications. Non-limiting examples of data processing include filtering, transformation, correlation, and fusion. Each desired software agent definition comprises an information set that identifies the particular software components from the software component toolset to be included in the corresponding software agent, along with component parameters and hierarchical linking information that define the behavior and operation of the software components.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
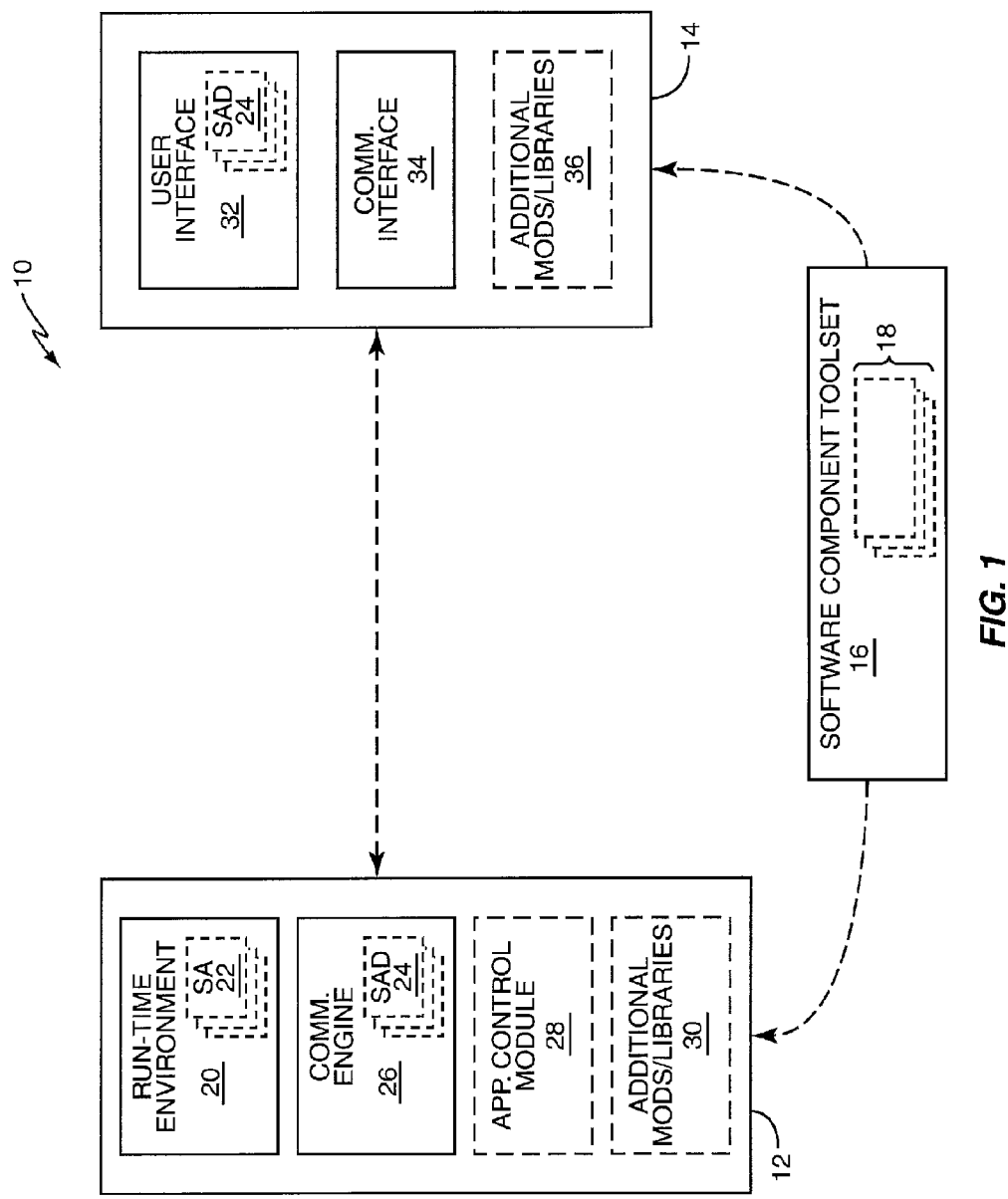
FIG. 1 is a block diagram of one embodiment of a software-based system for creating and managing intelligent nodes for operation in a distributed network.

FIG. 1 illustrates one embodiment of a system 10 for creating and configuring intelligent nodes in a distributed network of intelligent nodes. The system 10 includes a node operating computer program product 12, a node interfacing computer program product 14, and, optionally, a software component toolset 16 comprising a hierarchical set of software components 18 configured as building blocks for developing data acquisition, data processing, and control applications. For brevity, the node operating computer program product 12 is referred to as the "node software 12," and the node interfacing computer program product 14 is referred to as the "interfacing software 14."

The node software 12 is for installation and execution on a computer system (not shown) intended for operation as an intelligent node in a distributed network (not shown). In one or more embodiments, it comprises a run-time environment 20 for building and executing software agents 22 according to received software agent definitions 24. The node software 12 further includes a communication engine 26 having a default messaging protocol enabling a remote node to transfer desired software agent definitions 24 into the run-time environment 20. Optionally, the node software 12 includes an application control module 28, for controlling specified third-party applications, and for enabling the software agents 22 executing within the run-time environment 20 to interact with the specified third-party applications. "Inter-act" in this context connotes the ability of an appropriately-configured software agent 22 to start and stop specified third-party applications, and/or to share or otherwise transfer data between the software agent 22 and the specified third-party application(s). As an example of data sharing, a software agent 22 can read to or write from a file that is written to or read by a given third-party application, and/or can communicate through database connections or TCP/IP or other communication links. Additionally, or alternatively, the node software 12 may include one or more additional modules and/or libraries 30 that support or otherwise facilitate intelligent node operation; these modules/libraries 30 may, for example, add further communication capabilities, additional or specialized local file access and processing capabilities. It should be understood that such additional modules/libraries 30 generally are configured to support or operate in conjunction with one or both the communication engine 26 and the run-time environment 20.

As a non-limiting example of the run-time environment 20, the run-time environment 20 of the node software 12 may be configured at least partially in accordance with the teachings presented in the co-pending and commonly assigned U.S. patent application entitled, METHOD AND SYSTEM FOR RAPIDLY DEVELOPING AND DEPLOYING SENSOR-ENABLED SOFTWARE APPLICATIONS," which was filed on 8 Mar. 2007 and assigned application Ser. No. 11/683,761 (the "'761 application"). Particularly, certain aspects of the run-time environment 20 regarding the dynamic instantiation and execution of software agents 22 from corresponding software agent definitions 24 could be implemented at least partially in accordance with the "back-end application 204," shown in FIG. 13 of the '761 application.

In that context, the "system specifications" discussed in the '761 application represent a non-limiting example of one type of the software agent definitions 24 discussed herein. Correspondingly, the "component-based software systems" of the '761 application represent a non-limiting example of one type of the software agents 22 discussed herein. Broadly, a software agent definition 24 should be understood as a template or instruction set for building a desired software structure, including any custom commands/parameters needed to make the software structure perform the desired functions. Thus, the run-time engine 20 builds a given software agent 22, whose structures and operations are native to the execution space provided by the run-time engine 20, based on the "instructions" embodied in the corresponding software agent definition 24. One may thus understand the software agents 22 presented herein as a type of software "applet" that executes natively within the run-time environment 20 of the node software 12. Such applets may be distributed between nodes in a distributed network, as desired or needed, by sharing the underlying software agent definitions 24 between those nodes.

Indeed, it should be understood that the distributed network behavior of an intelligent node (i.e., a computer system running the node software 12) is defined by the particular software agents 22 executing in the run-time environment 20 of that node. More particularly, the specific structure and configurations of those executing software agents 22, as defined by the software agent definitions from which they were built, defines the distributed network behavior of the node and defines the rules for advertising and sharing that behavior. In this context, sharing a behavior encompasses a number of concepts, including the node software 12 running in one intelligent node sharing one or more of its resident software agents 22 with one or more other like intelligent nodes. "Like" in this sense does not necessarily mean identical or even similar computer system configurations, nor does it necessarily mean the same software or software versions. Rather, it simply connotes another computer system running some version of the node software 12 or the interfacing software 14, such that compatible communications may be carried out.

The concept of distributed network behavior additionally or alternatively extends to whether, and in what way, a given intelligent node shares data, commands, and other information with other intelligent nodes. The concept of behavior also extends to whether, and to what extent, a given intelligent node performs other-node discovery operations, and whether, and to what extent, a given intelligent node makes its own processes, (third-party) applications, and software agents 22 (or, equivalently, software agent definitions 24) available for inspection, modification, and transfer.

Notably, because the particular software agents 22 running on a given intelligent node define that node's distributed network behavior, one or more of those software agents 22 may be programmed such that any node on which they are executed seeks out other nodes with which to share those software agents 22. At least, such software agents 22 may be configured to advertise their availability for retrieval by other nodes. In this manner, software agents 22 may be automatically propagated across nodes in the same network, and in disparate networks, assuming some form of inter-network communications.

This behavior allows, for example, a user having access to a remote node with interfacing software 14 installed, to build up one or more software agent definitions 24 representing desired distributed network processing, and then transfer those software agent definitions 24 to a given computer system running the node software 12, for subsequent propagation. Of course, propagation, advertising, and modification of software agents 22 (or agent definitions 24) between intelligent nodes may be made subject to any level of authorization and authentication. Indeed, one or more embodiments of the node software 12 include program code to perform authorization checks by default, and the software agent definitions 24 may include additional or alternative authentication and authorization provisions.

Authorization/authentication processing itself represents a small subset of the intelligent processing that can be provided through user creation and configuration of software agent definitions 24. For example, a software agent 22 can be programmed to check other intelligent nodes for older versions of itself, and conditionally replace older copies of itself by causing copies of its corresponding software agent definition 24 to be transferred to those other nodes.

In at least one embodiment, the software agent definitions 24 are based on the software component toolset 16, as shown in FIG. 1. As noted, the toolset 16 comprises hierarchical software components 18 that are configured as building blocks for data acquisition, data processing, and control applications. (The component toolset 16 also includes communication components that enable communications, e.g., TCP/IP and other network communications for data distribution and remote control/interfacing.)

One embodiment of a software agent definition 24 thus comprises an information set identifying the particular software components from the software component toolset 16 to be included in the corresponding software agent 22, along with component parameters and hierarchical linking information that define the behavior and operation of the software components.

A user or, indeed, another software agent 22, thus can create a desired software agent definition 24 by selecting the desired software components from the toolset 16, setting the configuration details of those software components, and setting the desired linking between components. Example configuration details include specifying the logically named data sources/sinks to work with, the type of data processing and event monitoring to perform, details about how and when to share or distribute data (and in what format(s)), and the specific interactions to be carried out with other software agents 22 at the same or other nodes.

As one example, the software toolset 16 may be implemented at least partially in accordance with the details of the "toolset 12" described in the '761 application. A like or similar "toolset 12" is further described in the co-pending and commonly assigned U.S. patent application entitled, "METHOD AND SYSTEM FOR RAPIDLY DEVELOPING SENSOR-ENABLED SOFTWARE APPLICATIONS," which was filed on 14 Feb. 2007 and assigned application Ser. No. 11/674,893 (the "'893 application"). Still further, the reader may refer to the co-pending and commonly assigned U.S. patent application entitled, "RECONFIGURABLE, HIERARCHICAL COMPONENT-BASED ARCHITECTURE & FRAMEWORK AND METHODS FOR RAPIDLY DEVELOPING SENSOR DEVICE-ENABLING SOFTWARE APPLICATIONS," which was filed on 29 Jun. 2006 and assigned application Ser. No. 11/478,085 (the "'085 application"). The '761, '893, and '085 applications are expressly incorporated herein in their entireties.

Turning back to the details of FIG. 1, the interfacing software 14 is for installation and execution on a computer system (not shown) intended for use as an intelligent node interface, i.e., an interface for viewing, modifying, and monitoring intelligent nodes running copies of the node software 12. Providing that functionality is a user interface 32 and a communication interface 34. The user interface 32 is configured for building the desired software agent definitions 24 according to user-specified parameters, while the communication interface 34 is configured for transferring the desired software agent definitions 24 to one or more targeted intelligent nodes. The interfacing software 14 optionally includes one or more additional modules and/or libraries 36.

In one embodiment, at least certain portions of the interfacing software 14 can be implemented in accordance with the '761 application. For example, the Graphical User Interface (GUI) 166 of FIG. 11 could be adapted for use in the interfacing software 14, for enabling a user to build and configure software agent definitions 24 for transfer to intelligent nodes running the node software 12. It also should be understood that the interfacing software 14 can be installed along with the node software 12 on a given computer system, such that that computer system operates both as an intelligent node and as an interface for that node and for other, remote nodes. Still further, it should be understood that the node software 12 in one or more embodiments provides some or all of the interfacing software's configuration and inspection functionality.

Figure 2:
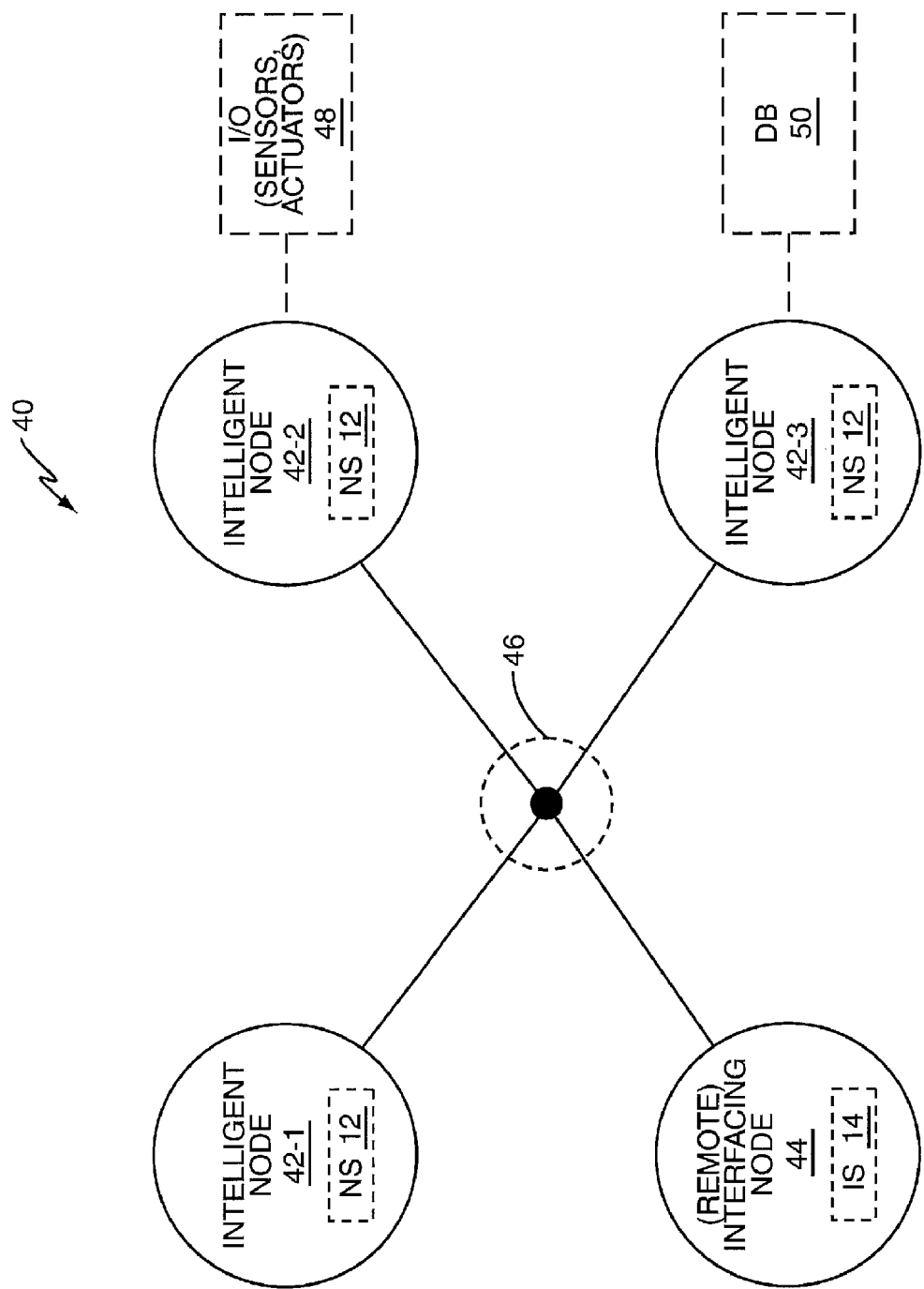
FIG. 2 is a block diagram of one embodiment of a distributed network, including one or more intelligent nodes.

With the above details in mind, FIG. 2 illustrates one embodiment of a distributed network 40, comprising a number of intelligent nodes 42 (shown as 42-1, 42-2, and 42-3), and a (remote) interfacing node 44. Communication links 46 provide connections between the intelligent nodes 42, and between the intelligent nodes 42 and the interfacing node 44. Each intelligent node 42 runs a copy of the node software 12, although not necessarily the same configuration or even same version of that software, and the interfacing node 44 runs a copy of the interfacing software 14.

Therefore, in accordance with the above-described functionality for the node software 12 and the interfacing software 14, it will be appreciated that a user at the interfacing node 44 can build and configure software agent definitions 24, and deliver those definitions to targeted ones of the intelligent nodes 42. Those targeted intelligent nodes 42 in turn can dynamically instantiate software agents 22 according to the details of the received software agent definitions 24. Further, to the extent that those instantiated software agents 22 are configured to interact with other intelligent nodes 42, a given targeted node 42 will interact accordingly with one or more other intelligent nodes 42 in the distributed network 40. As noted, the range and nature of interactions is limited only by the configurability of the software agents 22, and, of course, by limitations of the underlying computer systems and network communication links.

As an example of "building" an intelligent node for distributed network operation in the context of FIG. 2, one may assume that the node 42-2 has input-output devices 48 associated with it. The node 42-2 may, for example, be an "edge" computer system or device. In this context, "edge" devices are computing hardware and software systems, including servers, gateways, RTUs, and other computers, capable of acquiring, processing, fusing, and filtering data from assets, including sensors, actuators, wireless devices, RFID systems, imagery and video devices, data repositories, networks, and other systems and devices in order to provide more refined and meaningful data to a core enterprise network without having to transmit and process it at the core.

Accordingly, the node software 12 in the node 42-2 may be provided with one or more software agents 22 that are specifically tailored for the collection, processing, and distribution of data obtained from the I/O devices 48. Non-limiting examples of the I/O devices 48 include access-control/motion sensors, temperature or other environmental sensors, or other physical-world sensors. Of course, the I/O devices 48 also may include controlled output devices, such as actuators, alarms, etc., to be intelligently controlled by the software agent(s) 22 executing in the run-time environment 20 of the node software 12 at the node 42-2.

As a specific example, assume that data from the I/O devices 48 at the node 42-2 is to be collected and transmitted to the node 42-3, for entry into a database 50 included in or associated with the node 42-3. To this end, the run-time environment 20 of the node software 12 running at the node 42-2 executes a first software agent 22 that is configured to collect data from the I/O devices 48 and transmit the collected data, or processed results relating thereto, over the communication links 46 to the node 43-3. In turn, the run-time environment 20 of the node software 12 running at the node 42-3 executes a second software agent 22 that is configured to receive data from the first software agent 22, and further configured to store the received data in the database 50.

A user can tailor this process according to essentially any desired requirements. For example, the user could create a first software agent definition 24 that specifies desired data qualification and conditioning (e.g., filtering, range-testing, etc.), that controls how or when data is collected from the I/O devices 48. Further, the user can configure the first software agent definition 24 to specify how often collected data is transmitted, and in what format the collected data is sent. For example, the database 50 may comprise a MYSQL, ORACLE, or other database, and the first software agent definition 24 can be configured to specify data output in the appropriate format. The appropriately configured first software agent definition 24 is transferred to the node 42-2, and the run-time environment 20 at that node correspondingly instantiates and executes the first software agent 22, where that agent is imbued with the functionality and behavior described in the user-configured first software agent definition 24.

The user also configures a second software agent definition 24 that specifies the desired behavior for receiving and storing the data at the node 42-3. This second software agent definition 24 is transferred to the node 42-3, and the run-time environment 20 at that node correspondingly instantiates and executes the second software agent 22, where that agent is imbued with the functionality and behavior described in the user-configured second software agent definition 24.

In operation, the first software agent 22 at the node 42-2 collects data from the I/O devices 48 and conditions/transmits that data according to its specified behavior and the second software agent 22 at the node 42-3 receives that data and stores it in the database 50, according to its specified behavior. Either agent's behavior can be updated in real-time or near real-time, by sending updated first or second agent definitions to the appropriate node. In this regard, the communication engine 26 and/or the run-time environment 20 of the node software 12 is configured to receive agent definitions 24 and recognize whether a like-named software agent definition 24 is already resident at the node on which the node software 12 is installed. If so, the run-time environment 20 can be configured to follow default rules, such as replace-if-newer, etc. In this way, preexisting software agents 22 can be updated or replaced as needed.

In at least one embodiment, the run-time environment 20 is configured to unload a given executing software agent 22 if it receives a newer or modified version of the software agent definition 24 used to build that software agent 22. The run-time environment 20 uses the newer version of the software agent definition 24 to build and load the new version of the software agent 22. Of course, such rebuild/replace behavior can be conditioned on satisfying authorization/authentication requirements and the rules for rebuilding/replacing can be user-configured to change the default behavior. One sees, however, that these capabilities allow targeted ones of the nodes 42 to be updated on-the-fly in real-time or near real-time, simply by distributing updated software agent definitions 24 to the targeted nodes 42.

Figure 3:
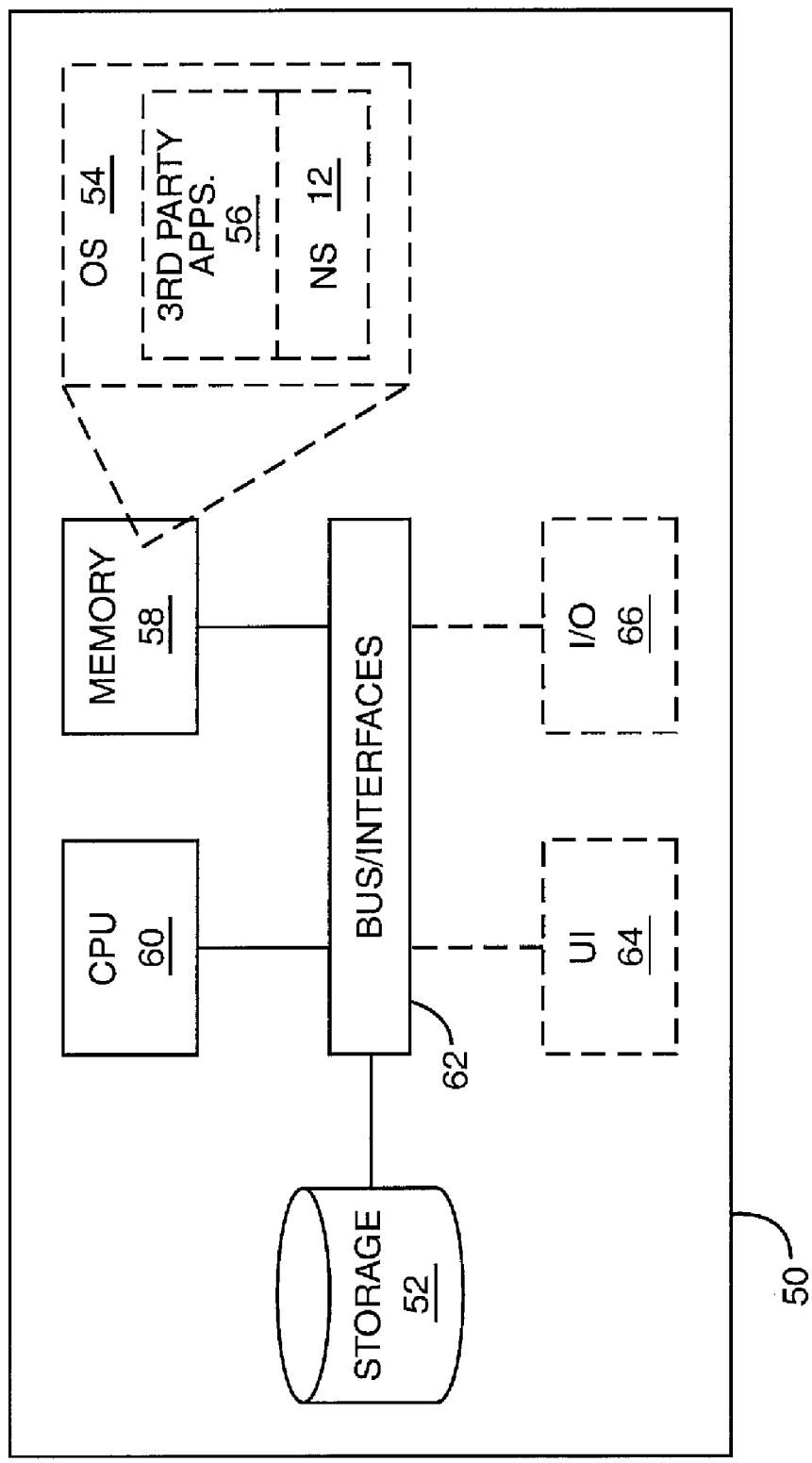
FIG. 3 is a block diagram of one embodiment of a computer system serving as a host for (intelligent) node software.

FIG. 3 illustrates example details for a computer system 50 representing any given one of the nodes 42 in the distributed network 40. Of course, it should be understood that the nodes 42 are not necessarily alike in terms of the underlying computer systems 50; indeed, a range of different computer systems 50 may make up the collection of nodes 42. The illustrated computer system 50 includes a disk drive or other data store 52, representing one form of a computer readable medium in which one or more computer program products may be retained. For example, the data store 52 may retain copies of computer operating system 54, one or more third-party applications 56, along with a copy of the node software 12. (Note that "third-party" in this context represents any software application not native to the node software 12. A non-limiting example of a third-party application would be an executable or library file providing device I/O or other device driver support, such as provided by the vendor of a data I/O product.)

In operation, the computer system 50 loads copies of the operating system 54, the node software 12, and, optionally, desired third-party applications 56, into a dynamic memory system 58, for execution/processing by a central processing unit (CPU) 60, which may be coupled to the data store 52 and memory 58 through one or more system buses/interfaces 62. The system buses/interfaces 62 also may provide connectivity to a user interface 64 (e.g., keyboard/monitor), and to various I/O devices or systems 66. Of course, general computer system details are well understood by those skilled in the art and the architecture/implementation of the computer system 50 is subject to wide variation. In general, computer system implementation details are not germane to the discussion herein.

However, in at least one embodiment, the operating system (OS) 54 is a WINDOWS operating system from MICROSOFT CORPORATION, such as WINDOWS 2000, XP, VISTA, 2000 SERVER, or 2003 SERVER, with support for MICROSOFT CORPORATION's .NET FRAMEWORK. Correspondingly, in such embodiments, the node software 12 comprises a WINDOWS/.NET FRAMEWORK application. A like implementation also applies to one or more embodiments of the interfacing software 14. In other embodiments, the node software 12 (and the interfacing software 14) is tailored for other computing environments, such as the LINUX/MONO platform.

One or more embodiments of the node software 12 and the interfacing software 14 include installation programs, allowing directory selection, etc. The node software 12 in particular can, in one or more embodiments, be installed as a WINDOWS Service, offering manual and automatic start options. The software also may provide options for setting whether the node software 12 service and any applications it starts (via the application control module 28) need to be visible and available for interaction from the WINDOWS desktop. At least one embodiment of the node software 12 enables its operation as a WINDOWS application rather than as a WINDOWS service.

After installation, the node software 12 comprises a main executable, and optional supporting dynamic link libraries (DLLs), such as a DLL for the software toolset 16 and DLLs supporting compressed file and piracy control operations. Additionally, the node software 12 includes or makes use of one or more configuration files, which may be extensible Markup Language (XML) or other standard format files. In one embodiment, a first XML configuration file lists connection parameters to be used by the node software 12 (e.g., IP address, port, etc.). Another XML configuration file lists the computer system's processes and their states (auto-start, start delay, etc.). Another XML configuration file lists the software agents 22 resident on the computer system 50, and lists their states/configurations, such as whether they are configured to auto-start when the node software 12 starts, and whether any start delays apply (such as might be used to provide for staggered startup of interdependent software agents 22).

The node software 12 may further define or specify a directory (and, optionally, subdirectories) for holding files transferred to it. Such files may represent transferred third-party applications, additions to or replacements for the above-described configuration files, and software agent definitions 24. In at least one embodiment, the software agent definitions 24 comprise XML files that represent "serialized" information corresponding to a set of software components selected from the toolset 16, along with their parameters and hierarchical inter-component linking information. Further, the node software 12 may define or specify a directory containing a daemon executable that is used when the interfacing software 14 is used to "flash" a new version of the node software 12 onto the computer system 50. This daemon shuts down the existing copy of the node software 12, overwrites with the new software files, and starts the new copy of the node software 12.

Figure 4:
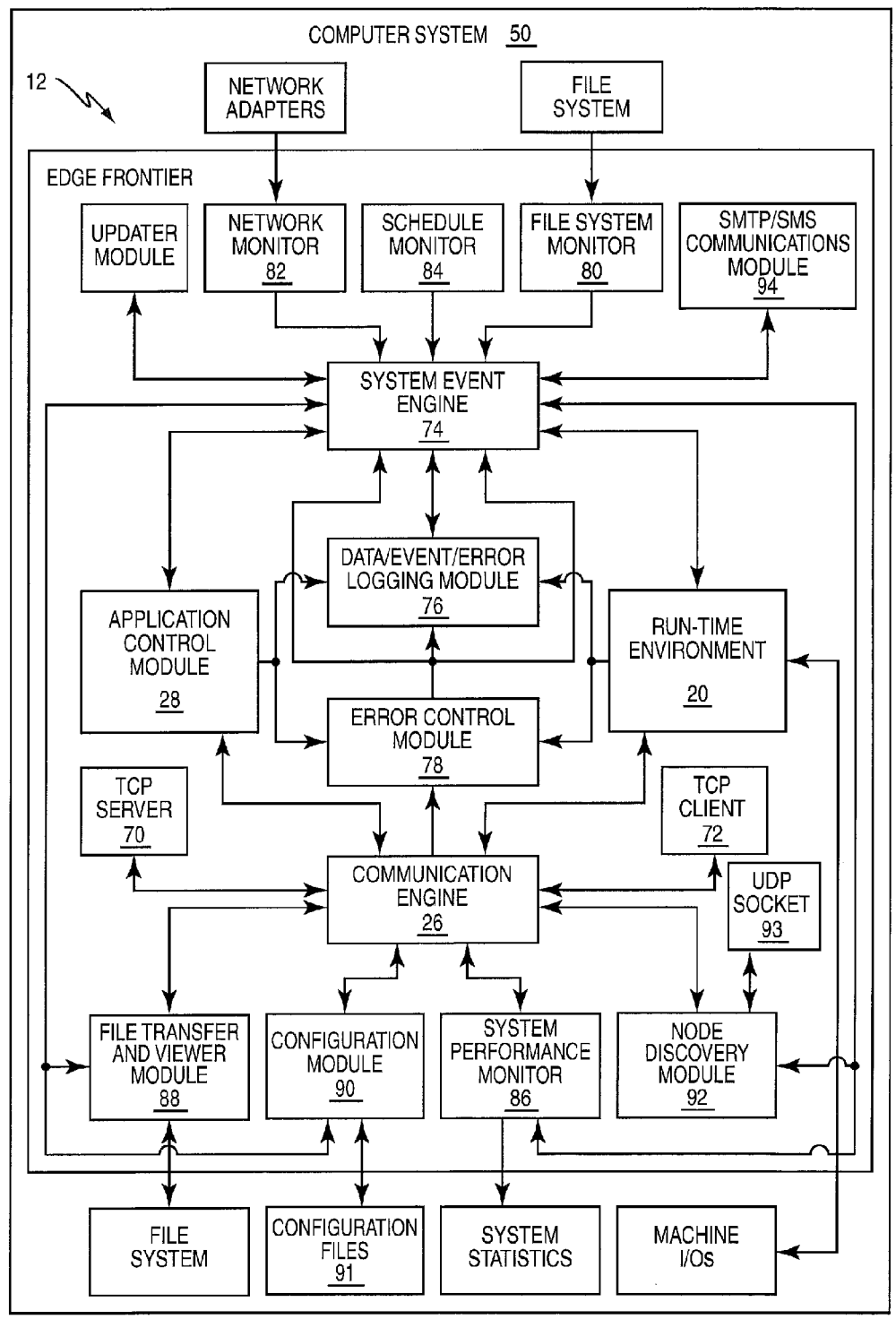
FIG. 4 is a block diagram of one embodiment of node software for operating a host computer system as an intelligent node in a distributed network.

Whether or not cast in the above WINDOWS Services/application context, FIG. 4 illustrates a more detailed embodiment of the node software 12 (although its core functionality remains centered on the previously illustrated run-time environment 20 and communication engine 26). Additional, complementary functional elements include without ordering of priority, a "TCP Listening Server 70" that is configured to await connections and commands from other nodes 42 (or 44) running copies node software 12 (or interfacing software 14). In at least one embodiment, given installations of the node software 12 and interfacing software 14 use predefined or user-configured encryption keys; thus, "clients" connecting to the TCP Listening Server 70 must be able to talk with the same encryption specifications or they will be ignored and/or disconnected.

In operation, the TCP Listening Server 70 awaits transmitted messages, data, and files from connecting clients, which are made available to the communication engine 26 for processing. Messages may be defined according to a predefined, default communication protocol that the communication engine is configured to recognize and process. Messages include, for example, the transfer in of software agent definitions 24, the request for software agent definitions 24, commands to start/stop third-party applications (which may be passed along to the application control module 28 for action), and commands to load/unload specified software agents 22 from the run-time environment 20. Other messages defined in one or more embodiments include various inspection requests, such as messages requesting listings of directory structures, resident software agents 22 (and their status as loaded, unloaded, auto-load, manual load, startup load delays, etc.), machine process listings, etc.

Depending upon whether an incoming transmission is a request or a command within the defined messaging protocol of the communication engine 26, the TCP Listening Server will either send back the requested information or process (fulfill) the command itself (or pass it along for action by the appropriate module or engine within the node software 12.

Complementing the TCP Listening Server 70, the illustrated embodiment of the node software 12 includes a TCP Client 72. The client 72 connects to like nodes 42 (or 44) for the transmission or request of files, including software agent definitions 24, and third-party applications. In at least one embodiment, the client 72 uses encrypted communications and therefore must communicate with the same encryption key as used by the nodes it is communicating with. Notably, software agents 22 executing in the run-time environment 20 of the node software 12 have access to the client 72, and thus can use it to send commands and requests according to the defined messaging protocol, and to request and send files and other information between nodes 42 or 44.

For example, at least one embodiment of the toolset 16 defines an "actions" software component configurable to take autonomous/semi-autonomous actions. Thus, an executing software agent 22 that includes an appropriately configured actions component might, for example, request the CPU % usage from another node 42. For load balancing/distribution, that actions component/software agent 22 may be configured to send over data or program threads to the reporting node 42 if the reported CPU % use is below a defined level, e.g., 50%. In one or more embodiments, the client 72 is configured to duplicate some or all of the commands and requests available via the interfacing software 14, such that a node 42 running a copy of the node software 12 can interact/control another node 42 in much the same manner as a user working with the interfacing software 14 at an interface node 44.

As implied in the illustration, the communication engine 26 cooperates with the server 70 and client 72. For example, the communication engine 26 processes all data, files, and messages incoming from other nodes 42 or 44, and generates messages, etc., for transmission to other nodes 42 or 44. Further, the communication engine 26 may be configured to unpack, decode, process, and pass along incoming data based on inspecting the data or data header messages appended to data.

Of course, as indicated earlier, the communication engine 26 also cooperates with the run-time environment 20, which maintains all of the software agents 22 resident on the host computer system 50. The run-time environment 20 is configured to serialize software agents 22 into an XML file (or other formatted file) for transfer via the communication engine 26 as software agent definitions 24. Correspondingly, the run-time environment 20 is configured to de-serialize software agent definitions 24 received through the communication engine 26. The run-time environment 20 dynamically instantiates software agents 22 from received software agent definitions 24, for native execution within the run-time environment 20. Of course, such instantiation and loading for execution may be controlled by configuration file information, and commands/messages indicating whether given software agents 22 should be loaded at startup, at zero delay or at some specified delay, or whether they should be manually loaded into the run-time environment 20 under command control. As noted, a start delay on software agent loading allows a given software agent 22 to be loaded and initialized before any software agent 22 that depends on it is loaded.

Similar auto/auto-delayed and manual loading control can be applied by virtue of the application control module 28. In general, the application control module 28 maintains and controls specified third-party applications installed on the host computer system 50. (Of course, a given application control module 28 may be configured to manage and control only a small subset of the third-party applications installed on the host computer system 50 that are relevant to the operations of the software agents 22 executing in the run-time environment 20.) In at least one embodiment, the application control module 28 loads and runs the specified third-party applications as WINDOWS Services. As a non-limiting example, a given software agent 22 may be configured to collect data from an I/O device, where the collection requires the software agent 22 to interact with a functionality provided by a third-party application associated with the I/O device. In this regard, the application control module 28 can be configured to automatically (or manually) load that supporting application, such that the application is available for interaction by the software agent 22. Configuration settings may be used to ensure that the specified application is loaded at startup/restart, to ensure its availability for use by the software agent 22.

Of course, the software agents 22 also may be configured to trigger and/or respond to a host of different event types.

Aiding such event-driven operation is a "System Event Engine 74" that is configured to manage/route event notifications from any of the executing software agents 22, as well as from or relating to the host computer system 50. System events include, for example, file system changes, connection events from other sources, and lost or found network connections. The System Event Engine 74 processes events and/or passes along corresponding event notifications to the software agents 22 that have subscribed to such events or that have otherwise been linked to such events by configuration settings in the underlying software agent definitions 24. In addition, in one or more embodiments, the System Event Engine 74 controls the invocation of timer based events such as scheduled tasks or actions.

A "Data/Event/Error Logging Module 76" complements operation of the System Event Engine 74 by logging event information to specified data files and/or databases. The Data/Event/Error Logging Module 76" also is configured to log specified data and/or errors, depending upon its configuration, which is user-settable via commands and/or local configuration file settings. Logged events can include, for example, different types/levels of errors, application or agent load/unload events, local and inter-node communication events, and agent replacement/updating events, along with system events such as file change events and network availability events.

Software execution errors represent another type of event that may be logged. In addition to any such logging, the node software 12 may include an "Error Control Module 78" that is configured to handle application errors that may occur. These errors may be handled by correcting the cause of the error and instructing the transaction to reprocess, catching the error and logging it to an error log, or catching the event and notifying an administrator through visual displays in the interface software 14, or, for example, by sending email(s)/text message(s).

Further, the illustrated embodiment of the node software 12 includes a "File System Monitor 80" that is configured to monitor specified directories/subdirectories for changes in the file system, including files and directories being created, deleted, changed, or renamed. The File System Monitor 80 also can raise events resulting in actions, such as loading specified software agents 22 into the run-time environment 20 for execution in the event that a specific file type or file name appears in a specific directory. Such events, of course, may be flagged by the System Event Engine 74.

Still further, the illustrated embodiment of the node software 12 includes a "Network Monitor 82" that is configured to monitor the network adapters present in the host computing system 50. In this capacity, the Network Monitor 82 detects when networks are lost, found, connected to, or disconnected from, and IP addresses are changed within the node 42. The Network Monitor 80 also can raise events resulting in actions such as stopping running applications, advertising node presence, or requesting/discovering the presence of other nodes 42 or 44. Advertising and other discovery processes may be carried out using, e.g., IPv4 or IPv6, or by providing translation between those protocol versions, as needed. To that end, the communications engine 26 may be configured to natively provide IPv4/IPv6 translation services. Alternatively, the node software 12 may include one or more supporting client/server communication modules that provide such services to the communication engine 26. Similarly, predefined client/server software components within the software toolset 16 may include prewritten methods for IPv4/IPv6 translation. In any case, as with the File System Monitor 80, the events thrown or otherwise detected by the Network Monitor 82 may be detected by the System Event Engine 74, and acted upon therein, or passed along for processing by one or more software agents 22.

Still further, the illustrated embodiment of the node software 12 includes a "Schedule Monitor 84" that is configured to monitor the host computing system's current time and raise events notifying other modules within the node software 12 (or software agents 22) that include time sensitive functionality. Examples of time-sensitive functionality include scheduled tasks or scheduled actions implemented within the run-time environment 20, or within any of the software agents 22 executing within it.

Still further, the illustrated embodiment of the node software 12 includes a "System Performance Monitor 86" that is configured to monitor hardware and software statistics from the host computing system 50. These statistics include items such as battery levels, CPU utilization, memory utilization, network bandwidth, disk usage, and running processes. This monitor is somewhat different from the others as it does not raise events but instead returns requested information.

Still further, the illustrated embodiment of the node software 12 includes a "File Transfer and Viewer Module 88" that is configured to process the sending and receiving of files between the host node 42 and other nodes 42 or 44. Additionally, the File Transfer and Viewer Module 88 encodes and decodes hierarchal system directory structures passed between the host node 42 and other nodes 42 or 44.

Still further, the illustrated embodiment of the node software 12 includes a "Configuration Module 90" that is configured to handle the setup and configuration of the node software 12 at the host node 42. Its configuration functionality includes setting passwords, encryption keys, IP addresses, and socket ports, and it may use information contained within one or more local configuration files 91 for configuration control. In general, node configuration information will be stored in configuration files and registries, and sensitive configuration information may be encrypted.

Still further, the illustrated embodiment of the node software 12 includes a "Node Discovery Module 92" that is configured to discover like intelligent nodes (i.e., other nodes 42 or 44) in a distributed network, and to aid discovery of its host node 42 by other nodes 42 or 44. In operation, the Node Discovery Module 92 processes requests to identify other nodes or to provide identification to outside requesting nodes.

The Node Discovery Module 92, or like functionality integrated into the communication engine 26 in one or more embodiments, may use any one or more discovery processes. For example, it may be configured to discover other nodes using one or more of active searching, such as port scanning, centralized node registration, such as DCHP/DNS lookup, and distribution lookup tables, such as MAC/IP addresses, and listening for broadcasts or advertisements from other nodes, such as listening for broadcasting and multicasting transmissions from other nodes advertising their presence. Further, the Node Discovery Module 92 may be set according to user-configurable options and rules that control its behavior with respect to advertising its host node's presence (transmitting availability or awareness information) and/or advertising other information regarding its host node.

Finally, the illustrated embodiment of the node software 12 includes an "SMTP/SMS Communications Module 94" that is configured to send email or text messages using an outside SMTP or SMS server (not shown). The functionality afforded by this module thus permits modules within the node software 12, or software agents executing within the run-time environment 20, to send/receive emails and short messages, such as for alarms, events, logging, etc.

Those skilled in the art will appreciate that the above collection of software modules within the node software 12 represents an advantageous arrangement, but is not limiting. Various ones of the ancillary or supporting modules may be omitted or included as needed or desired. For example, the SMTP/SMS Communications Module 94 may be omitted where that functionality is not required, or where appropriate communication links are not available. Further, it should be understood that the node software 12 may be packaged and sold as a base configuration, e.g., the run-time environment 20, communication engine 26, and application control module 28, and that various ones of the other illustrated modules may be later purchased and added as needed to existing installations of the node software 12.

It also should be appreciated that the modular nature of the node software 12 allows for the cooperative inclusion of other modules not illustrated. It is contemplated that special-purpose modules may be built for use in the node software 12. (Here, the term "module" generically refers to all separately identified entities within the node software 12, whether referred to as "monitors," "engines," or "modules.")

Regardless of the particular modules included in the node software 12, it should be appreciated the software agent definitions 24 configured for a particular installation of the node software 12 may be built and configured to exploit the functions and processes provided by those "built-in" modules. For example, rather than including communication-related software components from the software toolset 16 in a given software agent definition 24, a user simply may configure the relevant components within that definition to point to or otherwise use the communication modules (server/client 70/72) of the node software 12.

At a minimum, in one or more embodiments, the basic modules included in the node software 12 provide powerful default, "out-of-the-box" behaviors, which allow a given computer system 50 to operate as an intelligent node 42 in a distributed network. For example, one or more embodiments of the communication engine 26 and any of its supporting modules, enable the node 42 to advertise its presence in a distributed network, to discover other intelligent nodes within the distributed network, to provide listings of software applications, running software processes, computer system metrics and statistics, and software agents resident at the host node 42, and to request such listings from like nodes 42 in the distributed network.

Here, "processes" connotes by way of non-limiting example running instances of computer programs, including multiple software threads, being executed on the computer system 50. Further, metrics and statistics include by way of non-limiting example, CPU, memory and disk usage, and/or communication bandwidth usage. In other words, in one or more embodiments, the metrics/statistics indicate the availability of storage, processing, and communication resources at a given intelligent node 42, and thus are useful, for example, by software agents 22 that are configured to distribute data processing and communication tasks across two or more intelligent nodes 42.

Moreover, the built-in functionality provided by the node software 12 allows the node 42 to send third-party applications and software agents 22 and/or software agent definitions to other nodes 42 within the distributed network, and to receive such items from other nodes. Further, such as by way of the default messaging protocol of the communication engine 26, a given node 42 can be commanded to start and stop specified third party applications, and to load or unload specified software agents 22 from its run-time environment 20—loading and unloading software agents 22 in this sense may be understood as starting and stopping selected software agents 22 in the sense that a software agent 22 may be resident or otherwise available at a given node 42, but not actively executing unless it is loaded into the run-time environment 20. Thus, the particular distributed network behavior exhibited at a given node can be changed on the fly, by commanding it to load/unload particular software agents 22 that are resident at the node 42 and/or to start/stop particular third-party applications.

Figure 5:
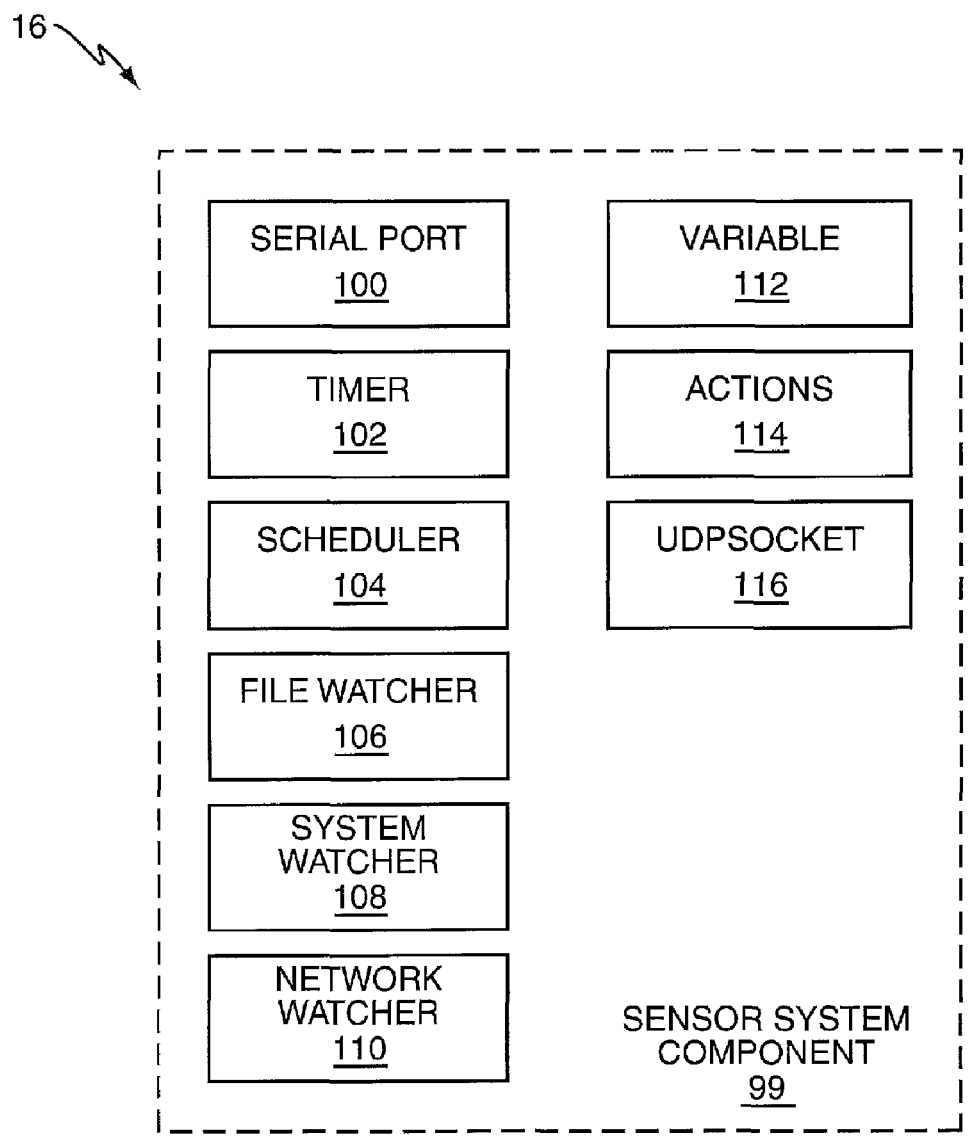
FIG. 5 is a block diagram of one embodiment of a software component toolset as hierarchical building blocks for constructing software agents for data acquisition, data processing, and control applications deployed at intelligent nodes in a distributed network.

Further, to better appreciate the power, flexibility, and convenience of the software agents 22, it is helpful to explore a preferred embodiment for their underlying software agent definitions 24. To that end, FIG. 5 illustrates a "sensor system component 99," which represents one type of building block component included in the software toolset 16. Note that the previously identified '761 and '893 applications identified software component toolsets using the reference numeral 12, and identified sensor system components derived wherefrom using the reference numeral 50. Those prior toolsets and sensor system components should be understood as exemplary but non-limiting implementations contemplated for the toolset 16 and the sensor system component 99 described herein.

In particular, the toolset 16 is, in one or more embodiments, expanded to include a number of software components that particularly enhance or enable distributed network operation of nodes 42 executing software agents 22 built from the toolset 16, e.g., components that enable or otherwise facilitate autonomous/semi-autonomous behavior. In more detail, the illustrated sensor system component 99 can hierarchically include any one or more of the following software components: a serial port component 100, a timer component 102, a scheduler component 104, a file watcher component 106, a system watcher component 108, a network watcher component 110, a variable component 112, an actions component 114, and a UDPSocket component 116. The UDPSocket component, for example, may be configured to send and receive uni-cast or broadcast messages. Further, it may be set to operate as a data source or data output for a sensor system component 99, and it may be linked to an actions component 114, for example, to establish a desired data flow.

Preferably, the illustrated components are implemented as "child" components of sensor system components 99, within the building block hierarchy of the toolset 16. However, other implementations, such as different parent-child hierarchies or peer-based arrangements, may be more advantageous for certain embodiments of the toolset 16. Regardless, it should be understood that the toolset 16 comprises, in one or more embodiments, the appropriate set of software class definitions for instantiating the software components as objects having appropriately defined methods for supporting the desired user-configurable behaviors.

As for the "out-of-the-box" functionality provided by the illustrated components, the serial port 100 is designed to read and write to serial port devices, and thus can serve as a data source or sink for other components within a sensor system component 99. The appropriate software agent definition 24 would include specified serial port addresses, etc., and data source/sink links to other named components, such as an actions component 114.

Continuing, the timer component 102 is configured to cause or trigger specified events at specified intervals. Timer component operations can advantageously provide timed stimulations/triggers for one or more actions components 114. Similarly, the scheduler component 104 causes an event at scheduled times, which may be set up for recurring operation, and these operations can be used to trigger actions components 114, as well.

The file watcher component 106 is configured to watch for changes in a specified file or directory. It thus can start or trigger events when a file or directory is created, deleted, changed, or renamed, and it can condition its operations on specified file(s) or file type(s), or file names containing specific text. Further, the file watcher component 106 can monitor subdirectories of a specified directory. For example, a file watcher component 106 may be configured to watch a directory into which received software agent definitions 24 or other transferred-in files are directed, files added to lower level subdirectories will be monitored as well and thus can trigger a new-file-arrival or other event as files are received at the host node 42. These and other file/directory monitoring events can be used as triggers for one or more actions components 114.

The system watcher component 108 is configured to watch for a specific system level statistic or metric, and can trigger events based on such statistics or metrics. These events, among other uses, can trigger one or more actions components 114. Example metrics are memory usage, CPU usage, hard disk usage, battery status, TCP and UDP events, software threads, and processes, etc. For example, a given system watcher component 108 may be configured by a user or by a software agent 22 to watch a specified hard drive for available disk space monitoring. For example, the component may have a metric category setting set to "Physical Disk", an instance Name setting set to "C:" and a Counter setting set to "Available Megabytes." The information received can be used for triggering processing decisions such as when to share an application or delete older log files.

The network watcher component 110 is configured to watch for connection changes to connected network devices such as Ethernet connections, wireless connections, loopback connections, etc. It can be configured to cause specified events when, for example, network availability has been lost or gained, an IP Address has been changed, etc. These events can be used as a trigger for one or more actions components 114.

The variable component 112 is configured to store data in memory for later access, with the advantage of being a named data container accessible to any number of sensor system components 99 that have been instantiated as software agents 22 (or portions of agents) within the run-time environment 20. Variable components 112 can be configured to cause an event when their values are set or changed, for example, and such events can be tied to one or more actions components 114.

In accordance with details, one sees that building a software agent definition 24 comprises, in one or more embodiments, selecting a sensor system component 99 from the toolset 16, and populating and linking selected child components within that sensor system component 99, according to the desired data sources/sinks, event processing, communications, etc. All specific aspects of the planned processing generally can be set simply by the user configuring the individual settings and parameters of the selected components, e.g., such as by identifying the serial port address to be read by a given serial port component 100. As each selected component is named and configured, later selected components may be linked or otherwise coupled to them by entering the appropriate component names in name fields, etc.

Complex software agent definitions 24 may be built up in this manner without need for writing any code. The desired processing may be installed/activated at a given node 42 simply by transferring the software agent definitions 24 to that node 42, for dynamic instantiation and execution by the run-time environment 20 hosted at the node 42. In this manner, entire networks of intelligent nodes may be created, simply by installing the node software 12 on individual computer systems 50 that are intended for operation as intelligent nodes 42, and then transferring or otherwise loading user-configured software agent definitions 24 into those nodes 42, along with any appropriate permissions, encryption settings, and other supporting configuration information.

Moreover, with appropriately configured software agents 22, individual nodes 42 can be imbued with any range of autonomous/semi-autonomous behavior. Individual nodes 42 can, for example, engage in other-node discovery and/or can advertise their presence and capabilities for other nodes 42. Further, a software agent 22 can be configured to take advantage of these discovery and advertising services to cause itself to be transferred automatically to other nodes 42, subject, for example, to version differences and compatibility checking, encryption verification, etc. With this capability, software versions and configurations can be propagated and maintained across entire networks of nodes 42, with no or very little user intervention/supervision.

Figure 6:
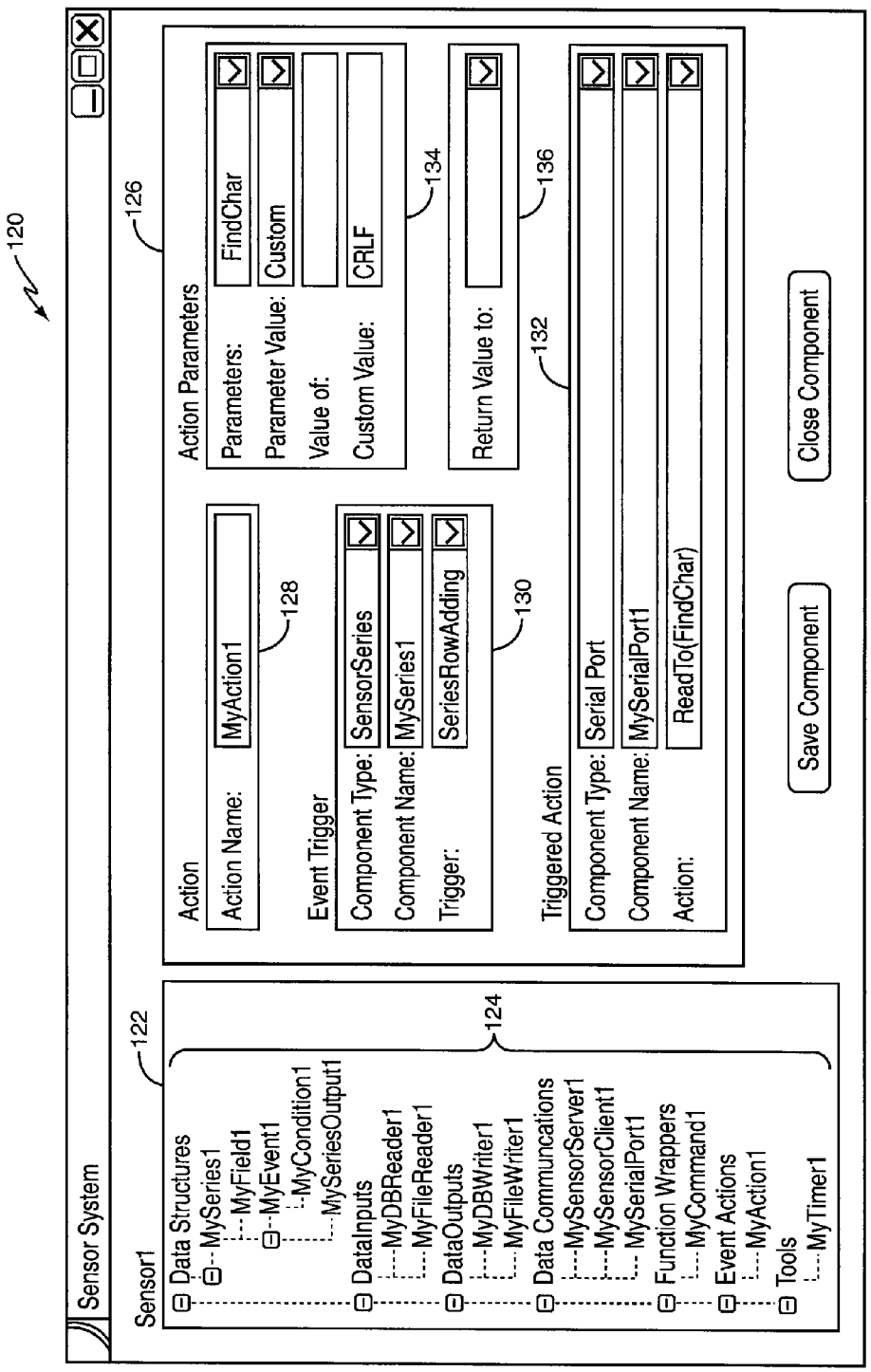
FIG. 6 is a diagram of a graphical user interface display, illustrating one embodiment of configuring an actions component from the software component toolset of FIG. 5.

The above distributed network behavior and/or other desired distributed network behaviors are, in at least some embodiments, particularly facilitated by the inclusion of the actions component 114 in the toolset 16, for use in building/instantiating software agents 22. As a non-limiting example, FIG. 6 illustrates a graphical user interface screen 120, such as might be displayed by the interfacing software 14 for use by a user that is configuring a software agent definition 24 that specifies an actions component 114 within a planned sensor systems component 99.

One sees that the screen 120 provides a tree-view window 122 that depicts the hierarchically linked structure of named child components 124 to be included within the planned sensor system component 99. Preferably, the tree-view groups the named components according to their links and types/sub-types, such as by grouping data structure software components, data input components, data output components, etc.

Of particular interest, one sees an "Event Actions" tree branch under which a named actions component 114 appears, "MyAction1." This name operates as a label for identifying this named instance of the actions component 114 to other components within the software agent 22 that will be instantiated from this software agent definition 24. (Likewise, the other logical names appearing in the tree view serve the same purpose for their respective components.)

Correspondingly, a configuration pane 126 displays all or at least a subset of the user-configurable parameters/settings that apply to the actions component 114 named MyAction1. (Notably, the configuration pane 126 changes as the named component selection in the tree-view window 122 is changed; thus providing the user with a very quick way of configuring and reviewing settings for the collection of child components within the sensor system component 99 being configured.) A name text input box 128 allows the user to enter the name for identifying this particular instantiation of the actions component 114—e.g., MyAction1. The triggers text input boxes 130 allow the user to define the type of component that will trigger MyAction1, and to indicate the specific name of the component that will trigger it (there may be many instances of any given component type, and the name specifies the specific instance). Further, the user indicates the particular operation or event that causes the trigger.

Continuing, the triggered action text input boxes 132 enable the user to specify the component type and the specific named component instance that MyAction1 will operate on responsive to being triggered. Still further, the user can specify the particular action to be taken; where the choices of defined actions to be taken will change depending upon the type of component to be acted upon. To the extent that the action requires additional data, such as the passing of command arguments or data, the user is also presented with parameters text input boxes 134, which allow the user to specify any such passed values. Further, a return value text box 136 enables the user to specify a named instance of a variable component 112 to which returned values are written. In turn, that link allows the named instance of the variable component 112 to hold returned values for processing by other components, such as for event throwing, etc. Still further, the user can specify that actions are to be taken on a system level, including shutting down the host computer system, restarting the system, transferring files, on an application level, including starting and stopping applications or transferring them to other nodes, and/or on a system agent level such as starting, stopping system agents 22 or transferring their definitions 24 to other nodes.

With the above node software capabilities and toolset components, a user can develop and distribute sophisticated data acquisition, data processing, and control applications, in the form of software agents 22 or, equivalently, in the form of corresponding software agent definitions 24. The user can accomplish sophisticated distributed network processing with no or very little programming, by virtue of the component building blocks in the toolset 16, and through use of the interfacing software 14, which may be configured to provide a point-and-click configuration environment, such as shown in FIG. 6, where component types, names, and parameters may be selected via drop-down lists, etc.

Broadly, the node software 12, interfacing software 14, and component toolset 16 represent a sophisticated system for building and managing intelligent nodes in a distributed network. Of course, it should be understood that the node software 12 has utility even without the availability of the toolset 16 and/or the interfacing software 14, given its ability to manage third-party applications, and to respond to a broad range of commands/messages in its predefined, default messaging protocol.

Supporting that broad functionality, in at least one embodiment, the node software 12 comprises a run-time environment 20 for dynamically instantiating and executing software agents 22 native to the run-time environment 20, in accordance with user-configured software agent definitions 24, the application control module 28 for controlling specified third-party applications installed on the host computer system, and for enabling the software agents 22 executing within the run-time environment 20 to interact with the specified third-party applications. Further, the node software 12 includes a communication engine 26 for pulling or otherwise receiving user-configured software agent definitions 24 into the host intelligent node from elsewhere in a distributed network, for dynamic instantiation and execution within the run-time environment 20.

In at least one embodiment, the node software's communication engine 26 is configured with a defined messaging protocol enabling it to interact with like communication engines in other intelligent nodes within the distributed network. In one or more embodiments, the defined messaging protocol includes messages for advertising, inspecting, and sharing user-configured software agent definitions with other intelligent nodes within distributed networks, and may further include messages for directing the run-time environment to load and unload specified software agents from the run-time environment.

Further, the defined messaging protocol may include messages for sharing data acquisition and processing information and control information arising from processing actions of the software agents 22 executing in the host node's run-time environment 20 with other nodes in a distributed network. Non-limiting examples of control information include commands and/or supporting information for controlling a host node and/or controlling devices attached directly or indirectly to the host node. Still further, the defined messaging protocol may include messages for sending third-party software applications from the host node and receiving third-party software applications at the host node, and wherein the communication engine 26 or an associated module within the node software 12 is configured to install third-party software applications on the host node.

In addition to the messaging capabilities, which generally represent out-of-the-box, default functions provided by the node software 12, the node software 12 may include or be associated with a predefined library of software components configured as hierarchical building blocks for implementing data acquisition, data processing, and control applications, e.g., the toolset 16 described earlier herein. Thus, each software agent definition 24 may comprise an information set specifying the types and numbers of software components to be instantiated from the predefined library of software components, and further comprise corresponding component configuration parameter settings and hierarchical component linking information. With that, the run-time environment 20 is configured to dynamically instantiate a given software agent 22 by instantiating, configuring, and linking software components from the predefined library of software components in accordance with the corresponding information set.

Thus, while one or more embodiments of the node software 12 and interfacing software 14 have the capability to send software agents 22 between nodes as serialized binary objects, it should be appreciated that the further or alternative ability to send software agent definitions 24 between nodes offers potentially significant gains in efficiency. That is, the functionality of a given software agent 22 built from defined software components can be represented completely but with much less information in the form of a software agent definition 24 that specifies the components to be used and the desired configuration of those components.

For example, the runtime environment 20 described herein can completely construct a new instance of a sensor system component 99, including all hierarchical child components, based on a few parameters that describe the desired configuration of each component and therefore the behavior of the entire sensor system component 99. The software agent definition 24 need only name the sensor system component 99 to be built, identify and name its child components, and specify the configurable parameters of those components, e.g., the data sources/sinks they will operate on, desired data processing, communication links, etc.

On the other hand, the run-time environment 20 in the targeted host node 42 will use that software agent definition 24 (and, e.g., the software toolset 16) to instantiate the corresponding software agent 22 during runtime, by dynamically creating the functional processes, data storage mechanisms, event handlers, data handlers, and assemblies. If the actual software agent 22 was to be serialized for transfer to the host node 42, all of the agent's dynamically created software entities would need to be serialized into a binary representation. Thus, the software agent definitions 24 generally are much smaller in size than their corresponding software agents 22, and therefore more efficiently transferred over the network connections between nodes. That efficiency may be particularly advantageous where limited-bandwidth (e.g., wireless) links interconnect one or more nodes.

Of course, further advantages are detailed herein for the case where the software agent definitions 24 represent instructions for building software agents 22 from a predefined library of software components available to the run-time environment 20 at a targeted host node 42. As noted, the predefined library of software components comprises the software toolset 16 in one or more embodiments, which may include a sensor system component 99 that operates as a self-contained data processing software agent linkable to specified data sources and data sinks, and operative to trigger specified processing and control actions responsive to detecting defined data events. Also, as noted, the predefined library of software components may include an actions component 114 that is linkable as a child component of a sensor system component 99, and is configured to imbue the sensor system component 99 with autonomous or otherwise automatic processing behavior. For example, each such actions component 114 is operative to carry out one or more actions with respect to a first software component in response to monitoring the first or a second software component for event occurrences, and each actions component 114 is configurable via information in the software agent definition 24 used to instantiate it.

At least one embodiment of the communication engine 26 is configured to receive software agent definitions 24 as serialized eXtensible Markup Language (XML) data, and to deserialize that data for processing by the run-time environment 20. The communication engine 26 may be further configured to serialize software agents 22 residing at the host node into serialized XML data, which may be in the form of XML files, for sharing with other intelligent nodes in the distributed network.

Functionality of the communication engine 26 and other modules implemented within the node software 12 may be aided or supported by, for example, a system event engine 74 that is, as previously noted, configured to provide software and hardware event visibility between and for the software agents 22 executing in the run-time environment 20 and/or for modules within the node software 12. Such modules may include a file processing module—e.g., the File Transfer and Viewer module 88—that is configured to cooperate with the communication engine 26, for sending files to and from the host node. The file processing module may be configured to process files containing serialized agent definitions 24 for transfer to and from the host node.

Other modules that may be implemented in the node software 12 include a configuration module 90 that is configured to process and maintain configuration files and registries for operation of the intelligent node within the distributed network, including passwords, encryption keys, IP addresses, and socket ports. Further modules include a node discovery module 92.

The node discovery module 92 is configured to determine the availability of other intelligent nodes in a distributed network using one or more of active searching, such as port scanning, centralized node registration, such as DCHP/DNS lookup, and distribution lookup tables, such as MAC/IP addresses, and listening for broadcasts or advertisements from other nodes, such as listening for broadcasting and multicasting transmissions from other nodes advertising their presence. Of course, any combination of these methods may be used, as well.

Further, a UDPSocket module 93 may be included as a "built-in" component of the node software 12, for further supporting the discovery module 92. For example, the UDPSocket module 93 may be configured to automatically receive broadcasts from other nodes, and to correspondingly inform the system event engine 74. The UDPSocket module 93 also is configured in one or more embodiments to broadcast to other nodes, where such broadcasting may be triggered by events, such as system starts and network changes (e.g., IP address changes, configuration updates, etc.).

Of course, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer program product stored in one or more non-transitory computer-readable media, said computer program product comprising program instructions configured to cause a computer system to operate as an intelligent node in a distributed network, and to cause said computer system to provide:
   a communication engine for pulling or otherwise receiving user-configured software agent definitions into the intelligent node from elsewhere in the distributed network, each said software agent definition received as an information set specifying the types and numbers of software components to be instantiated from a predefined hierarchical software component toolset installed at said computer system, and each said software agent definition comprising corresponding component configuration parameter settings and hierarchical component linking information for configuring and hierarchically linking the specified software components for instantiation;
   a run-time environment configured to dynamically instantiate a given software agent by selecting, instantiating, configuring, and linking software components from the predefined library of software components in accordance with the corresponding software agent definition, wherein the software agents executing within the run-time environment define the distributed network behavior of the intelligent node and define the rules for advertising and sharing that distributed network behavior within the distributed network; and
   an application control module for controlling specified third-party applications installed on the computer system, and for enabling the software agents executing within the run-time environment to interact with the specified third-party applications.

2. The computer program product of claim 1, wherein the communication engine is configured with a defined messaging protocol enabling it to interact with like communication engines in other intelligent nodes within the distributed network.

3. The computer program product of claim 2, wherein the defined messaging protocol includes messages for advertising, inspecting, and sharing user-configured software agent definitions with other intelligent nodes within the distributed network.

4. The computer program product of claim 2, wherein the defined messaging protocol includes messages for directing the run-time environment to load and unload specified software agents from the run-time environment.

5. The computer program product of claim 2, wherein the defined messaging protocol includes messages for sharing data acquisition, data processing, and control information arising from processing actions of the software agents executing in the run-time environment with other nodes in the distributed network.

6. The computer program product of claim 2, wherein the defined messaging protocol includes messages for sending third-party software applications from the intelligent node and receiving third-party software applications at the intelligent node, and wherein the communication engine or an associated module within the computer program product is configured to install third-party software applications on the intelligent node.

7. The computer program product of claim 2, wherein the defined messaging protocol includes messages for outputting listings of software agents and software processes that are installed or otherwise running at the computer system, and for requesting like listings from other nodes in the distributed network.

8. The computer program product of claim 2, wherein the defined messaging protocol includes messages for outputting listings of metrics and statistics of the computer system, and for requesting like listings from nodes in the distributed network.

9. The computer program product of claim 1, wherein the predefined hierarchical software component toolset includes a sensor system component that operates as a self-contained data processing software agent linkable to specified data sources and data sinks, and operative to trigger specified processing and control actions responsive to detecting defined data events.

10. The computer program product of claim 9, wherein the predefined hierarchical software component toolset includes an actions component linkable as a child component of a sensor system component and configured to imbue the sensor system component with autonomous processing behavior, each said actions component operative to carry out one or more actions with respect to a first software component in response to monitoring the first or a second software component for event occurrences, and each said actions component is configurable via information in the software agent definition used to instantiate it.

11. The computer program product of claim 1, wherein the communication engine is configured to receive software agent definitions as incoming serialized information, de-serialize said serialized information to recover the received software agent definitions, and to transfer the received software agent definitions to the run-time environment for processing, and wherein the communication engine is further configured to serialize software agents residing at the intelligent node into outgoing serialized information for sharing with other intelligent nodes in the distributed network.

12. The computer program product of claim 11, wherein the incoming and outgoing serialized information comprises eXtensible Markup Language (XML) data, and wherein the communication engine or an associated module within the computer program product is configured to de-serialize incoming XML data into software agent definitions, and to serialize software agent definitions into XML data for transfer to other intelligent nodes in the distributed network.

13. The computer program product of claim 1, further comprising a system event engine that is configured to provide software and hardware event visibility between and for the software agents executing in the run-time environment.

14. The computer program product of claim 1, further comprising a file processing module that is configured to cooperate with the communication engine for sending files to and from the intelligent node, and wherein the file processing module is configured to process files containing serialized software agent definitions for transfer to and from the intelligent node.

15. The computer program product of claim 1, further comprising a configuration module that is configured to process and maintain configuration files and registries for operation of the intelligent node within the distributed network, including passwords, encryption keys, IP addresses, and socket ports.

16. The computer program product of claim 1, further comprising a node discovery module that is configured to determine the availability of other intelligent nodes in the distributed network according to one or more configurable rules, said node discovery module using at least one of active searching for other nodes, accessing centralized node registration information, accessing distribution lookup tables, and listening for broadcasts or advertisements from other nodes.

17. A computer system including a Central Processing Unit (CPU) and configured to operate as an intelligent node in a distributed network, the computer system comprising:
   a communication engine for pulling or otherwise receiving user-configured software agent definitions into the intelligent node from elsewhere in the distributed network, each said software agent definition received as an information set specifying the types and numbers of software components to be instantiated from a predefined hierarchical software component toolset installed at said computer system, and each said software agent definition comprising corresponding component configuration parameter settings and hierarchical component linking information for configuring and hierarchically linking the specified software components for instantiation;
   a run-time environment configured to dynamically instantiate a given software agent by selecting, instantiating, configuring, and linking software components from the predefined library of software components in accordance with the corresponding software agent definition, wherein the software agents executing natively within the run-time environment define the distributed network behavior of the intelligent node and define the rules for advertising and sharing that behavior with other intelligent nodes in the distributed network; and
   an application control module for controlling specified third-party applications installed on the computer system, and for enabling the software agents executing within the run-time environment to interact with the specified third-party applications.

18. The computer system of claim 17, wherein the communication engine includes processing logic for generating and responding to predefined interaction messages enabling the intelligent node to carry out a predefined set of interactions with like intelligent nodes in the distributed network, including the advertising and sharing of software agents between like intelligent nodes.

19. The computer system of claim 17, wherein the communication engine and the run-time environment are communicatively coupled and configured to enable the software agents executing in the run-time environment to interact with other software agents executing in the run-time environments in other like intelligent nodes.

20. The computer system of claim 17, wherein the predefined hierarchical software component toolset comprises a predefined library of software components configured as hierarchical building blocks for implementing data acquisition, data processing, and control applications.

21. A system, stored in one or more non-transitory computer-readable media, for building distributed networks of intelligent nodes comprising:
- a node operating computer program product for installation and execution on a computer system intended for operation as an intelligent node, said node operating computer program product comprising a run-time environment for building and executing software agents according to received software agent definitions, and a communication engine having a default messaging protocol enabling a remote node to transfer desired software agent definitions into the run-time environment;
- a node interfacing computer program product for installation and execution on a computer system intended for use as an intelligent node interface, said node interfacing computer program product comprising user and communication interfaces for building the desired software agent definitions according to user-specified parameters, and transferring the desired software agent definitions to one or more targeted intelligent nodes; and
- a software component toolset installable at intelligent nodes for building software agents according to the desired software agent definitions, and comprising a hierarchical set of software components configured as building blocks for data acquisition, data processing, and control applications, wherein said desired software agent definitions each comprise an information set identifying the particular software components from the software component toolset to be included in the corresponding software agent, along with component parameters and hierarchical linking information that define the behavior and operation of the software components.

22. The system of claim 21, wherein the communication engine of the node operating computer program product is further configured, via the default messaging protocol, to provide for remote inspection of the run-time environment and software agents residing on the intelligent node, and to share software agents residing on the intelligent node with other like intelligent nodes.

* * * * *